United States Patent
Lee (10) Patent No.: US 12,551,588 B2
(45) Date of Patent: Feb. 17, 2026

(54) SYSTEM AND METHOD FOR STERILIZING VEHICLE

(71) Applicants: HYUNDAI MOTOR COMPANY, Seoul (KR); KIA CORPORATION, Seoul (KR)

(72) Inventor: Jae Seung Lee, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 1163 days.

(21) Appl. No.: 17/388,528

(22) Filed: Jul. 29, 2021

(65) Prior Publication Data
US 2022/0193278 A1  Jun. 23, 2022

(30) Foreign Application Priority Data
Dec. 17, 2020  (KR) .......... 10-2020-0177212

(51) Int. Cl.
| | |
|---|---|
| *B60N 2/00* | (2006.01) |
| *A61L 2/10* | (2006.01) |
| *A61L 2/24* | (2006.01) |
| *A61L 2/26* | (2006.01) |
| *B60N 2/02* | (2006.01) |
| *B60N 2/12* | (2006.01) |

(Continued)

(52) U.S. Cl.
CPC .......... *A61L 2/10* (2013.01); *A61L 2/24* (2013.01); *A61L 2/26* (2013.01); *B60N 2/0022* (2023.08); *B60N 2/0248* (2013.01); *B60N 2/12* (2013.01); *B60R 25/01* (2013.01); *B60S 1/64* (2013.01); *A61L 2202/11* (2013.01); *A61L 2202/14* (2013.01); *A61L 2202/25* (2013.01); *B60N 2210/20* (2023.08)

(58) Field of Classification Search
CPC .......................................... A61L 2/10
See application file for complete search history.

(56) References Cited

U.S. PATENT DOCUMENTS

| | | | |
|---|---|---|---|
| 2016/0250362 A1 | 9/2016 | Mackin | |
| 2017/0297537 A1* | 10/2017 | Yako | ........ B60N 2/90 |

(Continued)

FOREIGN PATENT DOCUMENTS

| | | |
|---|---|---|
| CN | 102803012 A | 11/2012 |
| CN | 105920632 A | 9/2016 |

(Continued)

OTHER PUBLICATIONS

DE_102012005674_A1 (Year: 2013).*

*Primary Examiner* — Elizabeth A Robinson
*Assistant Examiner* — Changru Chen
(74) *Attorney, Agent, or Firm* — Morgan Lewis & Bockius LLP (57) ABSTRACT

A system for sterilizing an interior of a vehicle includes: a sterilizer disposed on a driver's seat of the vehicle and configured to sterilize the interior of the vehicle; a driver detection sensor configured to detect a presence of a driver inside the vehicle; a seat movement adjustment mechanism configured to move the seat; and a controller configured to, in response to receiving a non-detection signal from the driver detection sensor, send driving signals to the seat movement adjustment mechanism and then apply a sterilizer operation signal for operating the sterilizer for a certain period of time upon movement of the driver's seat.

9 Claims, 6 Drawing Sheets (51) Int. Cl.
*B60R 25/01* (2013.01)
*B60S 1/64* (2006.01)

(56) References Cited

U.S. PATENT DOCUMENTS

2019/0076558 A1  3/2019  Zhang-Miske et al.
2020/0269738 A1  8/2020  Line et al.

FOREIGN PATENT DOCUMENTS

| | | | |
|---|---|---|---|
| CN | 109017588 A | 12/2018 | |
| CN | 111514322 A | 8/2020 | |
| DE | 102012005674 A1 * | 4/2013 | ............. B60K 15/03 |
| DE | 102013223079 A1 | 5/2015 | |
| JP | 2004-338618 A | 12/2004 | |
| JP | 2012254673 A | 12/2012 | |
| KR | 10-2011-0071613 A | 6/2011 | |
| KR | 10-2015-0017544 A | 2/2015 | |
| KR | 10-1717559 B1 | 3/2017 | |
| KR | 10-2019-0048487 A | 5/2019 | |
| KR | 10-2020-0008100 A | 1/2020 | |

\* cited by examiner

GENERAL CONDITION: IRRADIATION ANGLE IS LARGE AND LED INTENSITY IS WEAK

[FIG. 5B]

OPTIMAL CONDITION: IRRADIATION ANGLE IS SMALL AND LED INTENSITY IS STRONG

SYSTEM AND METHOD FOR STERILIZING VEHICLE

CROSS-REFERENCE TO RELATED APPLICATION

This application claims the benefit of priority to Korean Patent Application No. 10-2020-0177212 filed on Dec. 17, 2020 in the Korean Intellectual Property Office, the entire contents of which are incorporated herein by reference.

BACKGROUND

The present disclosure relates to a sterilization system and a sterilization method for a vehicle. More particularly, the present disclosure relates to a sterilization system and a sterilization method for a vehicle, capable of sterilizing an interior of a vehicle by adjusting a movement of a seat and sterilizing a steering wheel and the surroundings of the steering wheel using a sterilizer such as an ultraviolet light-emitting diode (UV LED) mounted on a headrest or the like.

TECHNICAL FIELD

A steering wheel is a component for a driver to hold and manually control directional movement of a vehicle. Thus, a driver is in frequent contact with a steering wheel compared to other components in the vehicle, and therefore, the most bacteria are inevitably distributed in the steering wheel.

In addition, car-sharing service vehicles, rental cars, and the like have been widely used by people, whenever the many people touch steering wheels, bacterial transmission or virus infection may occur. For example, virus infection and transmission (e.g., COVID-19) may occur just by touching a steering wheel with a hand Thus, a method of mounting an ultraviolet light-emitting diode (UV LED) on a headrest of a seat or a head lining and sterilizing a steering wheel with UV light irradiated from the UV LED may be applied as a method of sterilizing the steering wheel.

Figure 1:
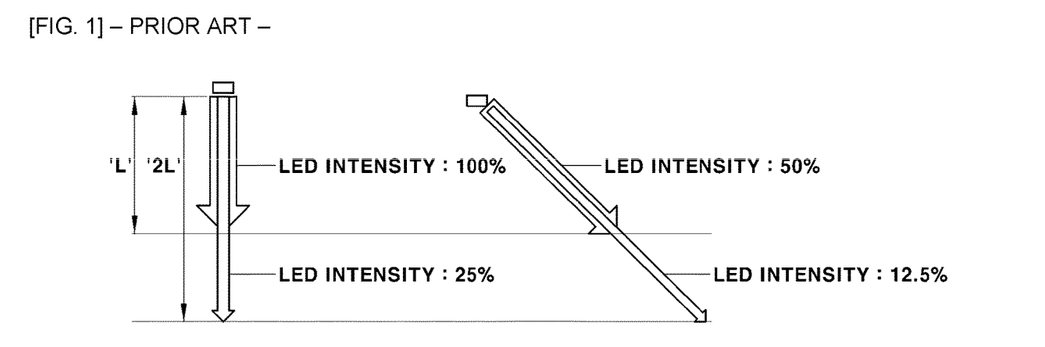
FIG. 1 is a schematic diagram illustrating that an intensity of ultraviolet (UV) light of a UV light-emitting diode (LED) is varied according to an irradiation distance and an irradiation angle in a related art.

Referring to FIG. 1, even when UV light is irradiated in a straight line from a UV LED, if a predetermined distance is exceeded, an intensity (strength) of the UV light is reduced from a maximum level of 100% to a level of 25%, and it is known that when an irradiation angle of the UV light emitted from the UV LED exceeds a predetermined angle, the intensity (strength) of the UV light is significantly reduced to a level of 12.5%.

Thus, when the UV LED is simply mounted on the headrest, a distance from the UV LED to the steering wheel is farther than the LED can reach so that a sterilization treatment effect is inevitably insignificant. In addition, when the UV LED is simply mounted on the head lining, the irradiation angle of the UV light emitted from the UV LED to the steering wheel exceeds a predetermined angle so that likewise, the sterilization treatment effect is inevitably insignificant.

The information included in this Background section is only for enhancement of understanding of the general background of the present disclosure and may not be taken as an acknowledgement or any form of suggestion that this information forms the prior art already known to a person skilled in the art.

SUMMARY OF THE DISCLOSURE

The present disclosure has been made in an effort to solve the above-described problems associated with prior art.

In one aspect, the present disclosure provides a sterilization system and a sterilization method for a vehicle, which are capable of easily sterilizing an interior of a vehicle such as a steering wheel with ultraviolet (UV) light emitted from a UV light-emitting diode (LED) by adjusting a distance between the steering wheel and the UV LED mounted on a headrest to a distance in which a sterilization effect due to the UV LED may be easily exhibited through a forward movement of a seat and a forward pivoting operation of a seatback when a getting-off condition of a driver and a passenger is satisfied in a starting-off state.

In another aspect, the present disclosure provides a sterilization system and a sterilization method for a vehicle, which are capable of maximizing the sterilization effect due to the UV light emitted from the UV LED by detecting, by a steering column angle sensor, a vertical tilt angle of the steering wheel and adjusting a forward pivoting angle of the seatback according to the detected vertical tilt angle of the steering wheel to allow the UV LED mounted on the headrest to be disposed collinear with a central portion of the steering wheel.

Objectives of the present disclosure are not limited to the above-described objectives, and other objectives of the present disclosure, which are not mentioned, can be understood by the following description and also will be apparently understood through embodiments of the present disclosure. Further, the objectives of the present disclosure can be implemented by means described in the appended claims and a combination thereof.

In an exemplary embodiment, the present disclosure provides a system for sterilizing an interior of a vehicle, which includes a sterilizer disposed on a driver's seat to sterilize an indoor space, a driver detection sensor configured to detect a presence of a driver in the vehicle interior, a seat movement adjustment mechanism configured to move the driver's seat, and a controller configured to apply a driving signal to the seat movement adjustment mechanism when receiving a non-detection signal of the driver detection sensor and then apply a signal for operating the sterilizer for a certain period of time.

The sterilizer may be employed as an ultraviolet light-emitting diode (UV LED) module mounted on a front portion of a headrest to emit UV light to a steering wheel and the surroundings thereof.

The UV LED module may include a bezel mounted on the front portion of the headrest, an LED control substrate mounted on a rear portion of the bezel, and an ultraviolet C (UVC) LED attached to the LED control substrate.

A lens configured to adjust an irradiation angle of the UV light according to a maximum diameter of the steering wheel may further be attached to a front portion of the UVC LED.

The driver detection sensor may be employed as a body pressure sensor embedded in the seat or a rear occupant alert (ROA) sensor mounted at a predetermined indoor position.

A door lock switch configured to lock or unlock a door and a door opening/closing switch configured to output an opening/closing signal of the door may further be outputably connected to the controller so as to determine a getting-off condition of a driver before the sterilizer is operated.

The seat movement adjustment mechanism may include an electric sliding device configured to adjust forward and backward movements of the seat, an electric reclining device configured to adjust forward and backward angles of the seatback, and a seat memory device.

When a door locking signal of the door lock switch and a door closing signal of the door opening/closing switch are received in a starting-off state and a sterilization request signal from a smart terminal held by a driver is received, the controller may be configured to determine a non-detection condition of a driver, apply a driving signal for a forward movement of the seat to the electric sliding device and a driving signal for a forward pivoting of the seatback to the electric reclining device, and then apply an operating signal for UV light irradiation to the UV LED module for a certain period of time.

The sterilization system further includes a steering column angle sensor configured to detect a vertical tilt angle of the steering wheel and transmit the detected vertical tilt angle to the controller.

The controller may be configured to apply a driving signal to the electric reclining device so as to adjust a forward pivoting angle of the seatback to an angle at which the UV LED module is disposed collinear with a central portion of the steering wheel according to the vertical tilt angle of the steering wheel, which is detected by the steering column angle sensor.

In another exemplary embodiment, the present disclosure provides a sterilization method for a vehicle, which includes determining a getting-off of a driver and detecting a driver present in a vehicle interior in a starting-off state; when a getting-off condition of a driver is satisfied and the driver present in the vehicle interior is not detected, adjusting a seat to direct the sterilizer mounted on a seat to face a steering wheel and the surroundings thereof; performing irradiation of UV light from the UV LED module mounted on the seat to the steering wheel for a certain period of time; and after the performing of the irradiation of the UV light for the certain period of time, moving the seat to its original position.

In the adjusting of the seat according to another embodiment of the present disclosure, when a closing condition of a door, a locking condition of the door, and a non-detection condition of the driver present in the vehicle interior are satisfied so as to determine the getting-off of the driver, a forward movement of the seat according to a driving of an electric sliding device and a forward pivoting of a seatback according to a driving of an electric reclining device may be performed.

The sterilization method according to another embodiment of the present disclosure may further include detecting a vertical tilt angle of the steering wheel and adjusting a forward pivoting angle of the seatback to an angle at which the UV LED module is disposed collinear with a central portion of the steering wheel through control of a driving amount of the electric reclining device according to the detected vertical tilt angle of the steering wheel.

The sterilization method according to another embodiment of the present disclosure may further include when a time in which the UV light is emitted from the UV LED module to the steering wheel exceeds the certain period of time, terminating, by a controller, sterilization control.

In another embodiment of the present disclosure, when a sterilization command signal according to a manual operation of an external smart terminal or a manual switch is input to the controller, before determining whether a sterilizer operating condition is satisfied, the adjusting of the seat and the performing of the irradiation of the UV light may be immediately performed.

The sterilization method according to another embodiment of the present disclosure may further include when any one among an opening condition of a door, an unlocking condition of the door, a condition in which a battery charging amount is less than a reference value, and a condition in which the UV LED module is overheated at a reference temperature or more is satisfied, terminating, by the controller, sterilization control.

In still another exemplary embodiment, the present disclosure provides a sterilization method for a vehicle, which includes determining a getting-off of a driver in a starting-off state; after a getting-off condition of the driver is satisfied, determining whether there is a sterilization request signal of an external smart terminal; when there is a sterilization request signal by the external smart terminal, detecting a driver present in a vehicle interior; when the driver present in the vehicle interior is not detected, adjusting a seat to direct a sterilizer mounted on a seat, to face a steering wheel and the surroundings thereof; performing irradiation of UV light from the UV LED module mounted on the seat to the steering wheel for a certain period of time; and after the performing of the irradiation of the UV light for the certain period of time, moving the seat to its original position.

In the adjusting of the seat according to still another embodiment of the present disclosure, when a closing condition of a door, and a locking condition of the door are satisfied so as to determine the getting-off of the driver and then a non-detection condition of the driver present in the vehicle interior is satisfied when there is the sterilization request signal of the external smart terminal, a forward movement of the seat according to a driving of an electric sliding device and a forward pivoting of a seatback according to a driving of an electric reclining device may be performed.

The sterilization method according to still another embodiment of the present disclosure may further include detecting a vertical tilt angle of the steering wheel and adjusting a forward pivoting angle of the seatback to an angle at which the UV LED module is disposed collinear with a central portion of the steering wheel through control of a driving amount of the electric reclining device according to the detected vertical tilt angle of the steering wheel.

The sterilization method according to still another embodiment of the present disclosure may further include when a time in which the UV light is emitted from the UV LED module to the steering wheel exceeds the certain period of time, terminating, by a controller, sterilization control.

In the sterilization method according to still another embodiment of the present disclosure, when a sterilization command signal according to a manual operation of an external smart terminal or a manual switch is input to the controller, before determining whether a closing condition of a door and a locking condition of the door are satisfied, the adjusting of the seat and the performing of the irradiation of the UV light may be immediately performed.

The sterilization method according to still another embodiment of the present disclosure may further include when any one among an opening condition of a door, an unlocking condition of the door, a condition in which a battery charging amount is less than a reference value, and a condition in which the UV LED module is overheated at a reference temperature or more is satisfied, terminating, by the controller, sterilization control.

Other aspects and preferred embodiments of the present disclosure are discussed infra.

It is understood that the term "vehicle" or "vehicular" or other similar term as used herein is inclusive of motor vehicles in general such as driver automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogenpowered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the present disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure.

It should be understood that the appended drawings are not necessarily to scale, presenting a somewhat simplified representation of various preferred features illustrative of the basic principles of the present disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter, exemplary embodiments of the present disclosure will be described in detail with reference to the accompanying drawings.

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Figure 2:
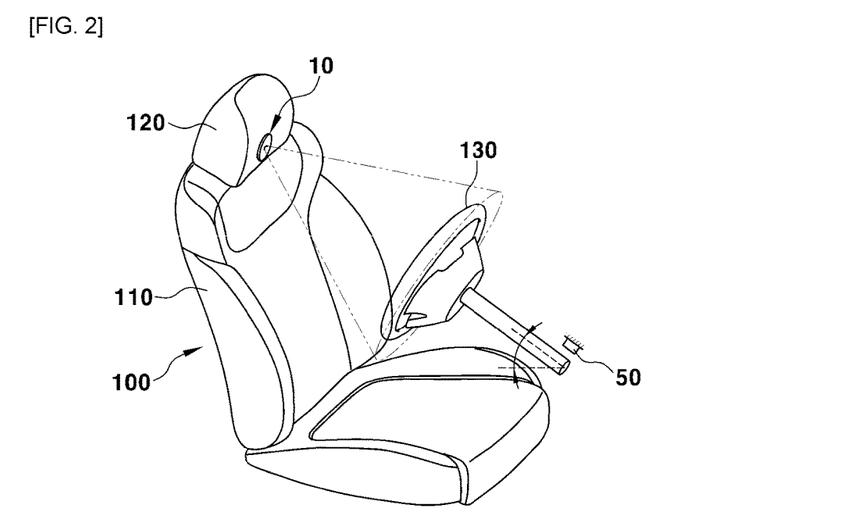
FIG. 2 is a configurational diagram illustrating a sterilization system for a vehicle according to an exemplary embodiment of the present disclosure.
Figure 3:
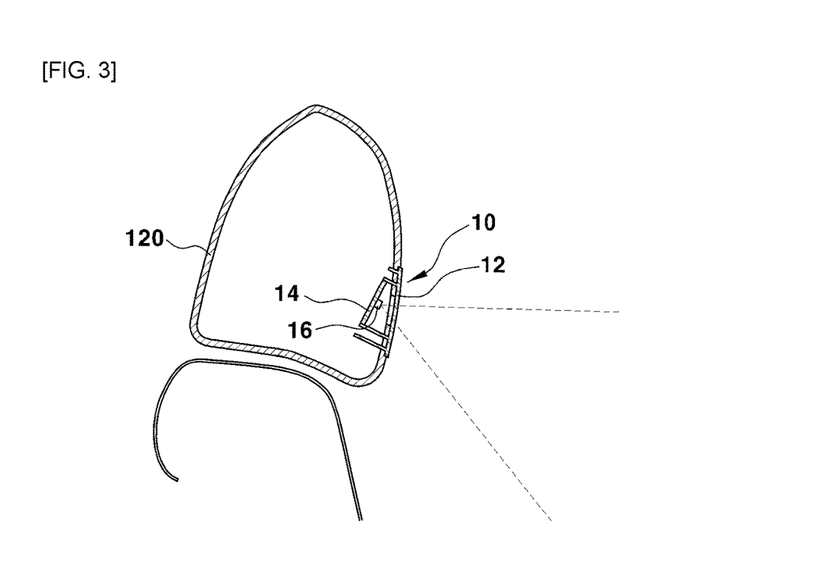
FIG. 3 is a cross-sectional view illustrating a state in which a UV LED among components of the sterilization system for a vehicle is mounted on a headrest according to an exemplary embodiment of the present disclosure.
Figure 4:
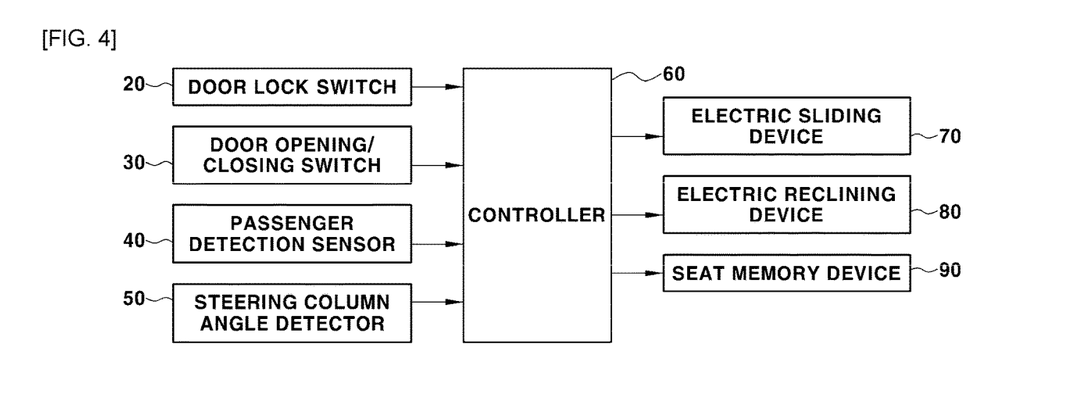
FIG. 4 is a control block diagram illustrating the sterilization system for a vehicle according to an exemplary embodiment of the present disclosure.

FIG. 2 is a configurational diagram illustrating a sterilization system for a vehicle according to an exemplary embodiment of the present disclosure, FIG. 3 is a cross-sectional view illustrating a state in which an ultraviolet light-emitting diode (UV LED) among components of the sterilization system for a vehicle is mounted on a headrest according to an exemplary embodiment of the present disclosure, and FIG. 4 is a control block diagram illustrating the sterilization system for a vehicle according to an exemplary embodiment of the present disclosure.

As shown in FIG. 2, a UV LED module 10 for emitting UV light to a steering wheel 130 and the surroundings of the steering wheel 130 may be mounted on a headrest 120 which is mounted on an upper portion of a seatback 110.

The UV LED module 10 is one kind of sterilizer for sterilizing an indoor space. However, instead of the UV LED module 10, a sterilizer for spraying a liquid phase disinfectant to an indoor surface including the steering wheel 130 may be mounted at a predetermined position of the seatback 110 and the headrest 120.

As shown in FIG. 3, the UV LED module 10 includes a bezel 12 made of a transparent material and mounted on a front portion of the headrest 120, an LED control substrate 14 mounted on a rear portion of this bezel 12 and located in the headrest 120, and an ultraviolet C (UVC) LED 16 attached to a front portion of the LED control substrate 14 and configured to emit UV light to the outside through the bezel 12.

A general UV LED may be used as an LED which emits UV light. In various embodiments, however, a UVC LED, which is separately developed for sterilization, can be used so as to maximize a sterilization effect with respect to a steering wheel.

As shown in FIG. 4, in order to determine whether to operate the UV LED module 10 for emitting UV light to the steering wheel 130, a door lock switch 20 for locking or unlocking a door, a door opening/closing switch 30 for outputting an opening/closing signal of the door, and a driver detection sensor 40 for detecting a driver in a vehicle interior may be used.

As the driver detection sensor 40, a body pressure sensor embedded in the seat and configured to detect a body pressure of a driver, or a rear occupant alert (ROA) sensor, which is a type of radio detecting and ranging (RADAR) sensor, mounted at a predetermined indoor position (e.g., a predetermined position on a head lining) and configured to detect whether a driver may be used.

In addition, as a seat movement adjustment mechanism, which allows the UV LED module 10 mounted on the headrest 120 to be moved to the steering wheel 130 as close as possible, may include an electric sliding device 70, an electric reclining device 80, and a seat memory device 90, which are operated in response to a driving signal of a controller 60.

For reference, the electric sliding device 70 refers to a known electric component which may be formed of various mechanisms between a seat rail and a seat cushion frame so as to adjust a front position and a rear position of the seat, and the electric reclining device 80 is to adjust an angle of the seatback by pivoting the seatback forward or backward and refers to a known electric component which may be formed of various mechanisms at a boundary between the seatback frame and the seat cushion frame.

The controller 60 may be formed of a control logic which automatically performs sterilization on the steering wheel or formed of a control logic which performs sterilization on the steering wheel when there is a request from an external smart terminal.

Furthermore, the term related to a control device such as "controller", "control unit", "control device" or "control module", etc. refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned disclosure can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

In various exemplary embodiments of the present disclosure, each operation described above may be performed by a control device, and the control device may be configured by a plurality of control devices, or an integrated single control device.

In various exemplary embodiments of the present disclosure, the control device may be implemented in a form of hardware or software, or may be implemented in a combination of hardware and software.

Thus, the controller 60 is a control logic for automatically sterilizing the steering wheel. When a door locking signal of the door lock switch 20, a door closing signal of the door opening/closing switch 30, and a non-detection signal of the driver detection sensor 40 are received, the controller 60 may be configured to apply a driving signal for a forward movement of the seat 100 to the electric sliding device 70 and, simultaneously, apply a driving signal for a forward pivoting of the seatback 110 to the electric reclining device 80, and then apply an operating signal for emitting UV light to the UV LED module 10 for a certain period of time.

In various embodiments, the controller 60 may be a control logic for performing sterilization on the steering wheel 130 when there is a request from an external smart terminal. When the door locking signal of the door lock switch 20 and the door closing signal of the door opening/closing switch 30 are received and a sterilization request signal from a smart terminal held by a driver is received, and then when the non-detection signal of the driver detection sensor 40 is received so as to determine a non-detection condition of a driver, the controller 60 may be configured to apply a driving signal for a forward movement of the seat 100 to the electric sliding device 70 and a driving signal for a forward pivoting of the seatback 110 to the electric reclining device 80 and then apply an operating signal for emitting UV light to the UV LED module 10 for a certain period of time.

Meanwhile, in order to maintain an intensity (strength) of the UV light emitted from the UV LED module 10 to the steering wheel 130 above a predetermined level, it is preferable that a central portion of the UV light is disposed collinear with a central portion of the steering wheel 130.

To this end, the sterilization system of the present disclosure further includes a steering column angle sensor 50 for detecting a vertical tilt angle of the steering wheel 130 to transmit the vertical tilt angle to the controller 60.

In one embodiment, the steering column angle sensor 50 may be employed as an angle measurement sensor installed at a predetermined position of a steering column on which the steering wheel 130 is mounted to be steerable and configured to detect a vertical tilt angle of the steering wheel 130.

As is known, since the steering wheel 130 is tiltable upward or downward according to a physical condition of a driver, when the controller 60 receives a detection signal from the steering column angle sensor 50, the vertical tilt angle of the steering wheel 130 may be accurately measured.

Thus, when the controller 60 receives a vertical tilt angle of the steering wheel 130 from the steering column angle sensor 50, the controller 60 applies a signal for controlling a driving amount to the electric reclining device 80 to adjust a forward pivoting angle of the seatback 110 to an angle at which the UV LED module 10 is disposed collinear with the central portion of the steering wheel 130 so that the central portion of the UV light emitted from the UV LED module 10 may be disposed collinear with the central portion of the steering wheel 130.

Figure 5A:
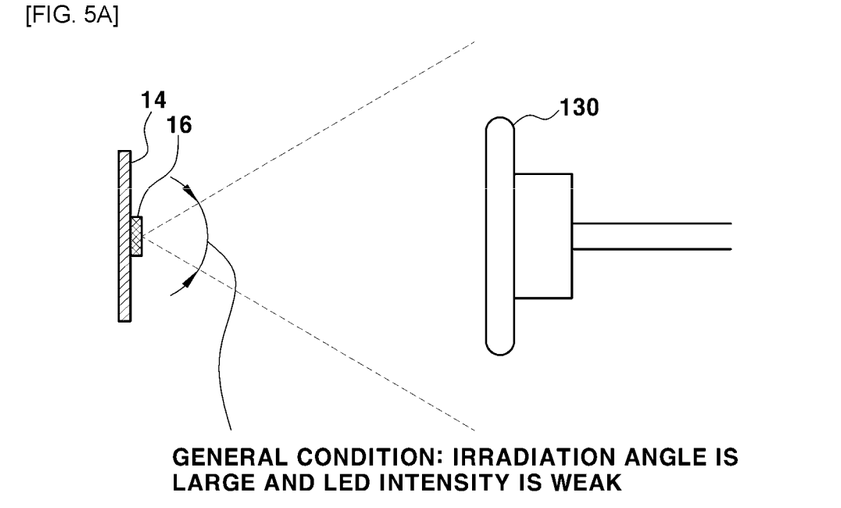
FIGS. 5A and 5B are schematic diagrams illustrating an example in which an irradiation angle of UV light is adjusted according to whether a lens is attached to the UV LED of the sterilization system for a vehicle according to an exemplary embodiment of the present disclosure.

Referring to FIG. 5A, when an angle of a UV light emitted from a UVC LED 16 is greater than a maximum diameter of the steering wheel 130, an intensity of the UV light may be weak.

Figure 5B:
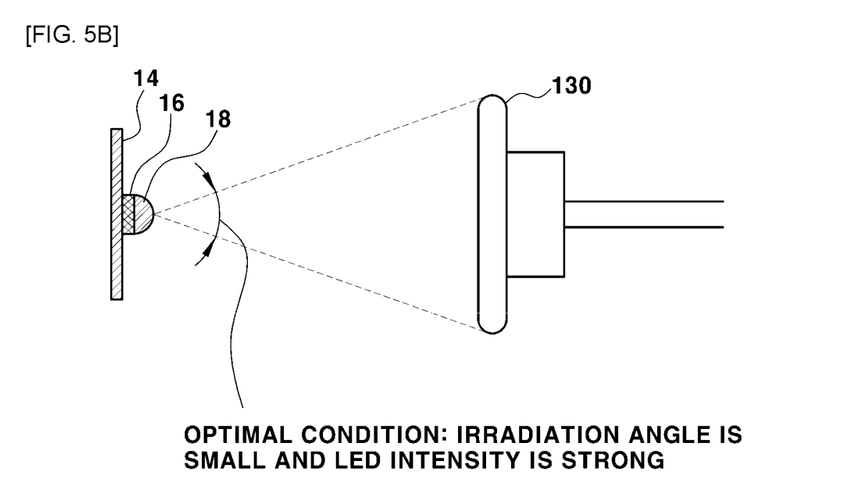

On the other hand, as shown in FIG. 5B, a lens 18 is further attached to a front portion of the UVC LED 16 among components of the UV LED module 10, and thus an irradiation angle of the UV light emitted from the UVC LED 16 may be adjusted to fit the maximum diameter of the steering wheel 130 so that the intensity of the UV light emitted from the UVC LED 16 may be kept strong until the UV light reaches the steering wheel 130.

Here, a sterilization method of the present disclosure performed based on the above-described configuration will be described in detail as follows.

First Embodiment

Figure 6:
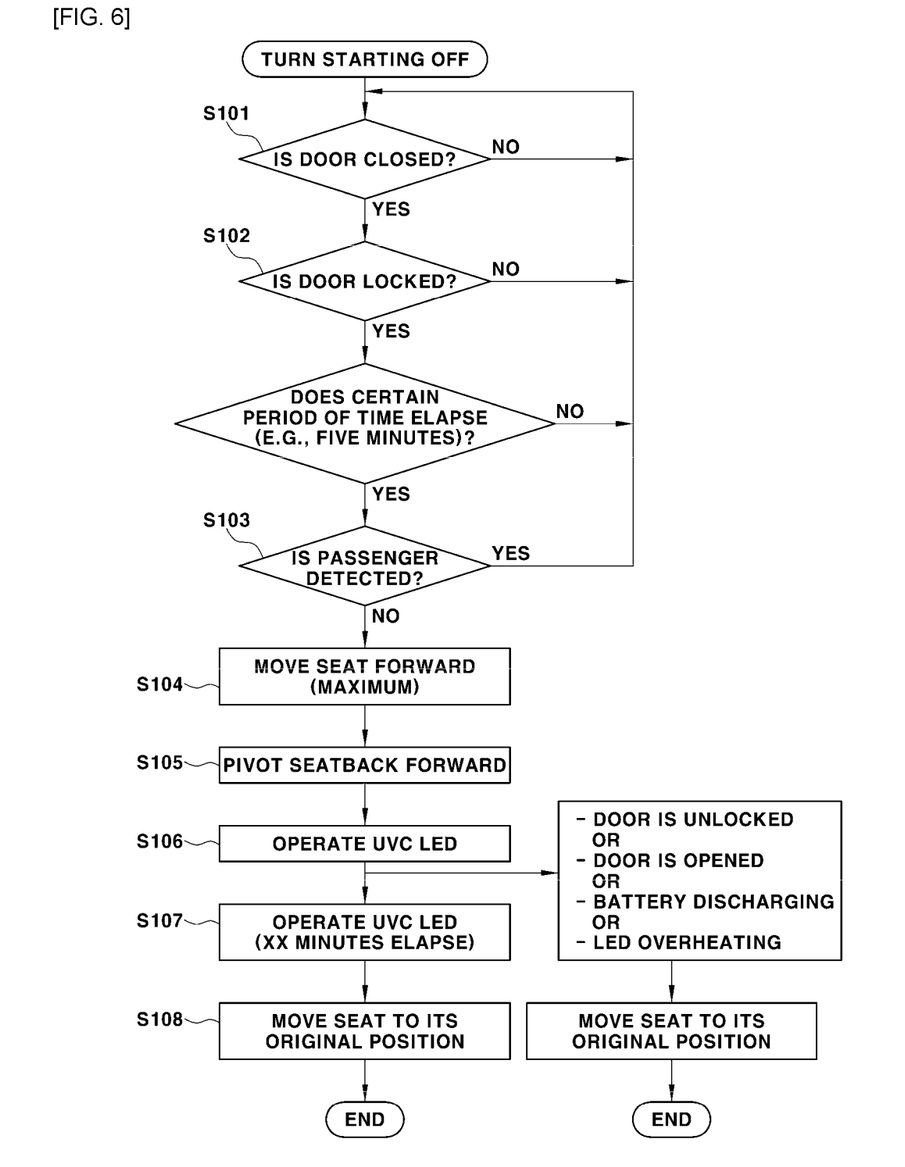
FIG. 6 is a flowchart illustrating one embodiment of a sterilization method for a vehicle according to an exemplary embodiment of the present disclosure.

The sterilization method according to one embodiment of the present disclosure is characterized in that, when a getting-off condition of a driver is satisfied in a starting-off state of a vehicle, a sterilization control process is automatically performed on the steering wheel 130 and the surroundings thereof.

FIG. 6 is a flowchart illustrating one embodiment of the sterilization method for a vehicle according to the present disclosure.

First, a getting-off condition of a driver is determined in a starting-off state of a vehicle.

Then, it is determined whether a door is closed, and if yes, whether the door is locked (S101 and S102).

For example, when a driver gets off the vehicle, after turns a starting off, and close the door, a door closing signal of the door opening/closing switch 30 is transmitted to the controller 60, and subsequently, when the driver performs a door lock operation using a smart key, the door locking signal of the door lock switch 20 is transmitted to the controller 60.

Thus, when the controller 60 receives the door locking signal of the door lock switch 20 and the door closing signal of the door opening/closing switch 30, it is determined that the getting-off condition of a driver is primarily satisfied.

However, since drivers other than the driver may remain in the vehicle interior, it is determined whether a non-detection condition of a driver is satisfied so as to determine whether a driver is present in the vehicle interior after a certain period of time elapses (S103).

For example, when the controller 60 receives a driver non-detection signal from a body pressure sensor or an ROA sensor, which is employed as the driver detection sensor 40, it is determined that there is no driver in the vehicle interior.

Subsequently, when all of a closing condition of the door, a locking condition of the door, and a non-detection condition of a driver in the vehicle interior are satisfied, a forward movement of the seat 100 due to a driving of the electric sliding device 70 and a forward pivoting of the seatback 110 due to a driving of the electric reclining device 80 are performed (S104 and S105).

Thus, the seat 100 is moved forward as much as possible and, simultaneously, the seatback 110 is inclined toward the steering wheel 130 so that the UV LED module 10 mounted on the headrest 120 becomes a state of being close to the steering wheel 130 as much as possible.

Next, UV light is emitted from the UVC LED 16 of the UV LED module 10 mounted on the headrest 120 toward the steering wheel 130 for a predetermined period of time (S106).

As described above, when the getting-off conditions of a driver and a driver are satisfied in the starting-off state, a distance between the UV LED module 10 mounted on the headrest 120 and the steering wheel 130 is automatically adjusted to a distance in which a sterilization effect due to a UV LED module 10 may be easily exhibited through the forward movement of the seat 100 and a forward pivoting operation of the seatback 110 so that the steering wheel 130 may be easily sterilized due to the UV light emitted from the UV LED module 10.

In order to maintain an intensity (strength) of the UV light emitted from the UV LED module 10 to the steering wheel 130 above a predetermined level, it is preferable that a central portion of the UV light is disposed collinear with a central portion of the steering wheel 130.

Figure 8:
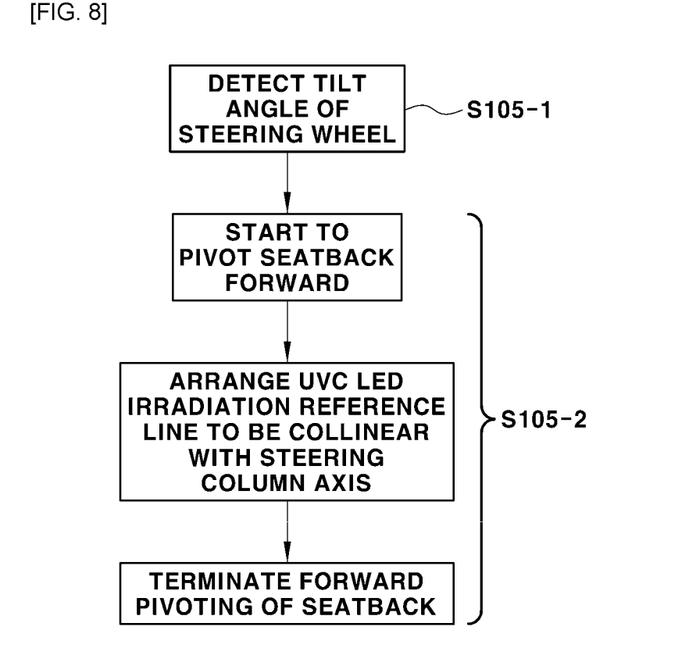
FIG. 8 is a flowchart illustrating a process of performing a forward reclining of a seatback in each embodiment of the sterilization method for a vehicle according to an exemplary embodiment of the present disclosure.

To this end, as shown in FIG. 8, the operation in which the forward pivoting of the seatback 110 is performed (S105) includes detecting a vertical tilt angle of the steering wheel 130 (S105-1) and adjusting a forward pivoting angle of the seatback 110 according to the detected vertical tilt angle of the steering wheel 130 (S105-2).

In this case, in the adjusting of the forward pivoting angle of the seatback 110 (S105-2), the forward pivoting angle of the seatback 110 is adjusted to an angle at which the UV LED module 10 is disposed collinear with the central portion of the steering wheel 130 through control of a driving amount of the electric reclining device 80.

More specifically, when the controller 60 receives a vertical tilt angle of the steering wheel 130, which is detected by the steering column angle sensor 50, the controller 60 applies a signal for controlling a driving amount to the electric reclining device 80 to adjust the forward pivoting angle of the seatback 110 to an angle at which a UVC LED irradiation reference line of the UV LED module 10 is disposed collinear with a steering column axis (the central portion of the steering wheel 130) so that the central portion of the UV light emitted from the UV LED module 10 may be disposed collinear with the central portion of the steering wheel 130.

As described above, the forward pivoting angle of the seatback 110 is adjusted according to a tilting angle of the steering wheel 130 to allow the UV LED module 10 mounted on the headrest 120 to be disposed collinear with the central portion of the steering wheel 130 so that it is possible to maximize a sterilization effect on the steering wheel 130 and the surroundings thereof due to the UV light emitted from the UVC LED 16 of the UV LED module 10.

In the above embodiment, the sterilization control process on the steering wheel 130 and the surroundings thereof has been automatically performed, but as an example of a manual operation, when a sterilization command signal according to a manual operation of an external smart terminal or a manual switch is input to the controller 60, before determining whether a sterilizer operating condition is satisfied, the adjusting of the seat 100 (S104 and S105) and the irradiation of the UV light (S106) may be immediately performed.

When it is determined that a time in which the UV light is emitted from the UV LED module 10 to the steering wheel 130 exceeds a certain period of time (a predetermined sterilization time) (S107), the controller 60 terminates the sterilization control so that the seat 100 and the seatback 110 may be driven to return to their original positions (S108).

For example, when it is determined that the time in which the UV light is emitted from the UV LED module 10 to the steering wheel 130 exceeds the certain period of time (the predetermined sterilization time) (S107), the seat 100 and the seatback 110 may be driven and controlled to return to their original positions toward a seat position recorded in the seat memory device 90.

During the sterilization control process, when any one among the opening condition of the door, the unlocking condition of the door, a condition in which a battery charging amount is less than a reference value, and a condition in which the UV LED module 10 is overheated at a reference temperature or more is satisfied, the controller 60 terminates the sterilization control.

That is, since the opening condition of the door and the unlocking condition of the door are conditions in which drivers are allowed to board, and the condition in which the battery charging amount is less than the reference value is a condition for preventing battery discharging, and the condition in which the UV LED module 10 is overheated at the reference temperature or more is a condition for preventing fire, when any one among these conditions is satisfied, the sterilization control is terminated.

Second Embodiment

Figure 7:
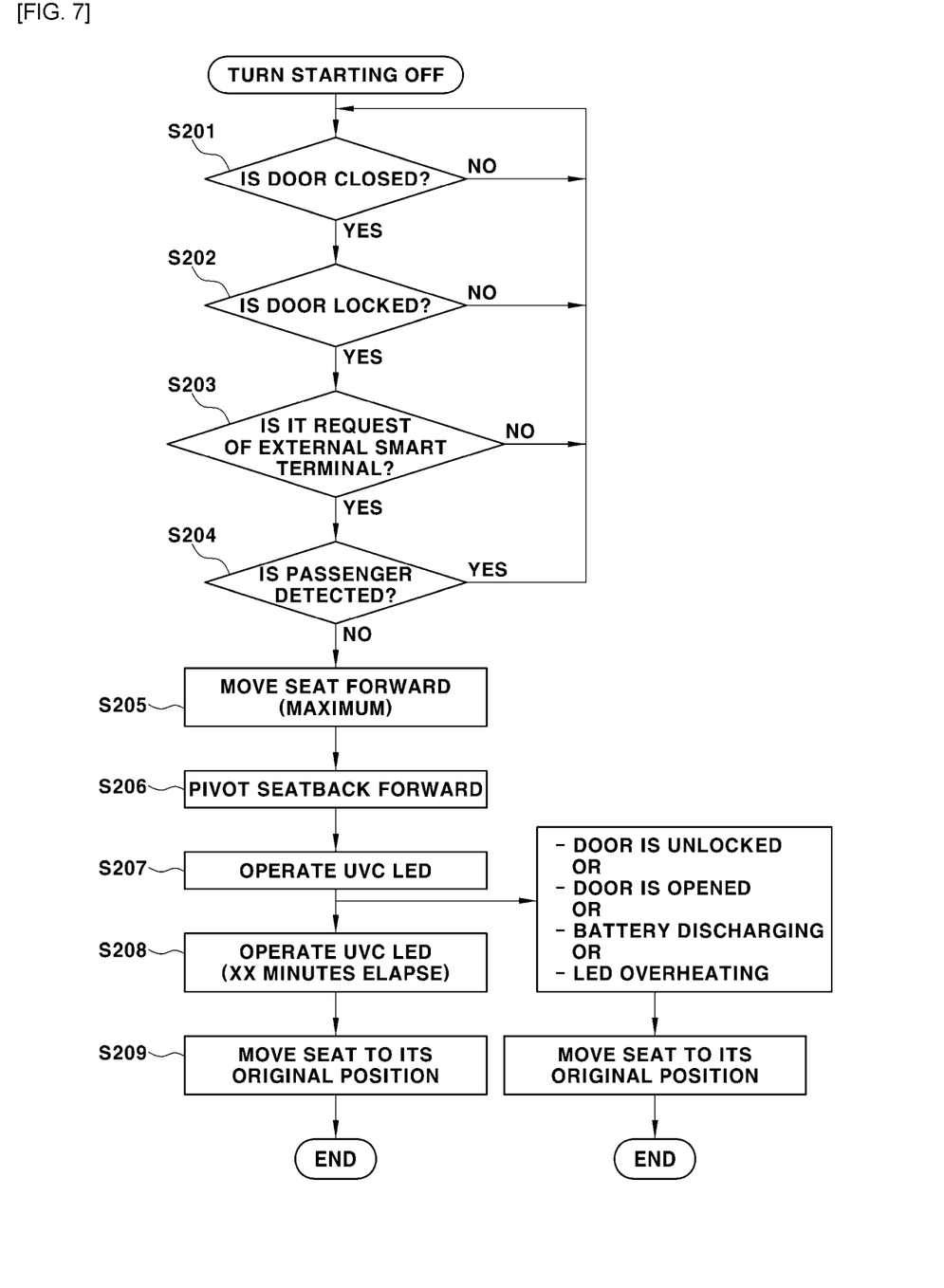
FIG. 7 is a flowchart illustrating another embodiment of the sterilization method for a vehicle according to an exemplary embodiment of the present disclosure.

The sterilization method according to another embodiment of the present disclosure is characterized in that, when there is a request from an external smart terminal in the starting-off state of the vehicle, a sterilization control process is performed on the steering wheel 130 and the surroundings thereof.

FIG. 7 is a flowchart illustrating another embodiment of the sterilization method for a vehicle according to the present disclosure.

First, a getting-off condition of a driver is determined in a starting-off state of a vehicle.

Then, it is determined whether a door is closed, and if yes, whether the door is locked (S201 and S202).

For example, when a driver gets off the vehicle, after turns a starting off, and close the door, a door closing signal of the door opening/closing switch 30 is transmitted to the controller 60, and subsequently, when the driver performs a door lock operation using a smart key, the door locking signal of the door lock switch 20 is transmitted to the controller 60.

Thus, when the controller 60 receives the door locking signal of the door lock switch 20 and the door closing signal of the door opening/closing switch 30, it is determined that the getting-off condition of a driver is primarily satisfied.

Subsequently, after a closing condition of the door and a locking condition of the door are satisfied, it is determined whether there is a sterilization request signal of an external smart terminal (S203), and when there is the sterilization request signal by the external smart terminal, it is determined whether a non-detection condition of a driver present in the vehicle interior is satisfied (S204).

For example, when the controller 60 receives a wireless signal (sterilization request signal) from the external smart terminal, since drivers other than the driver may remain in the vehicle interior, it is determined whether the non-detection condition of a driver is satisfied so as to determine whether there are drivers in the vehicle interior for a certain period of time.

Subsequently, after the controller 60 receives the wireless signal (sterilization request signal) of the external smart terminal, when the non-detection condition of a driver present in the vehicle interior is satisfied, a forward movement of the seat 100 due to a driving of the electric sliding device 70 and a forward pivoting of the seatback 110 due to a driving of the electric reclining device 80 are performed (S205 and S206).

Thus, the seat 100 is moved forward as much as possible, and simultaneously, the seatback 110 is inclined toward the steering wheel 130 so that the UV LED module 10 mounted on the headrest 120 becomes a state of being close to the steering wheel 130 as much as possible.

Next, UV light is emitted from the UVC LED 16 of the UV LED module 10 mounted on the headrest 120 toward the steering wheel 130 for a predetermined period of time (S207).

As described above, when the getting-off conditions of a driver and a driver are satisfied in the starting-off state, a distance between the UV LED module 10 mounted on the headrest 120 and the steering wheel 130 is automatically adjusted to a distance in which a sterilization effect due to a UV LED module 10 may be easily exhibited through the forward movement of the seat 100 and a forward pivoting operation of the seatback 110 so that the steering wheel 130 may be easily sterilized due to the UV light emitted from the UV LED module 10.

In order to maintain an intensity (strength) of the UV light emitted from the UV LED module 10 to the steering wheel 130 above a predetermined level, it is preferable that a central portion of the UV light is disposed collinear with a central portion of the steering wheel 130.

To this end, as shown in FIG. 8, the operation in which the forward pivoting of the seatback 110 is performed (S206) includes detecting a vertical tilt angle of the steering wheel 130 (S105-1) and adjusting a forward pivoting angle of the seatback 110 according to the detected vertical tilt angle of the steering wheel 130 (S105-2).

In this case, in the adjusting of the forward pivoting angle of the seatback 110 (S105-2), the forward pivoting angle of the seatback 110 is adjusted to an angle at which the UV LED module 10 is disposed collinear with the central portion of the steering wheel 130 through control of a driving amount of the electric reclining device 80.

More specifically, when the controller 60 receives a vertical tilt angle of the steering wheel 130, which is detected by the steering column angle sensor 50, the controller 60 applies a signal for controlling a driving amount to the electric reclining device 80 to adjust the forward pivoting angle of the seatback 110 to an angle at which a UVC LED irradiation reference line of the UV LED module 10 is disposed collinear with a steering column axis (the central portion of the steering wheel 130) so that the central portion of the UV light emitted from the UV LED module 10 may be disposed collinear with the central portion of the steering wheel 130.

As described above, the forward pivoting angle of the seatback 110 is adjusted according to a tilting angle of the steering wheel 130 to allow the UV LED module 10 mounted on the headrest 120 to be disposed collinear with the central portion of the steering wheel 130 so that it is possible to maximize a sterilization effect due to the UV light emitted from the UVC LED 16 of the UV LED module 10.

In the above another embodiment, the sterilization control process on the steering wheel 130 and the surroundings thereof has been automatically performed, but as an example of a manual operation, when a sterilization command signal according to a manual operation of an external smart terminal or a manual switch is input to the controller 60, before determining whether the closing condition of the door and the locking condition of the door are satisfied, the adjusting of the seat 100 (S205 and S206) and the irradiation of the UV light (S207) may be immediately performed.

When it is determined that a time in which the UV light is emitted from the UV LED module 10 to the steering wheel 130 exceeds a certain period of time (a predetermined sterilization time) (S208), the controller 60 terminates the sterilization control so that the seat 100 and the seatback 110 may be driven to return to their original positions (S209).

For example, when it is determined that the time in which the UV light is emitted from the UV LED module 10 to the steering wheel 130 exceeds the certain period of time (the predetermined sterilization time) (S208), the seat 100 and the seatback 110 may be driven and controlled to return to their original positions toward a seat position recorded in the seat memory device 90.

During the sterilization control process, when any one among the opening condition of the door, the unlocking condition of the door, a condition in which a battery charging amount is less than a reference value, and a condition in which the UV LED module 10 is overheated at a reference temperature or more is satisfied, the controller 60 terminates the sterilization control.

That is, since the opening condition of the door and the unlocking condition of the door are conditions in which drivers are allowed to board, and the condition in which the battery charging amount is less than the reference value is a condition for preventing battery discharging, and the condition in which the UV LED module 10 is overheated at the reference temperature or more is a condition for preventing fire, when any one among these conditions is satisfied, the sterilization control is terminated.

The present disclosure provides the following effects through the above-described problem solving means.

First, when the getting-off condition of a driver and a driver are satisfied in a starting-off state, a distance between a UV LED module mounted on a headrest and a steering wheel is automatically adjusted to a distance in which a sterilization effect due to the UV LED module may be easily exhibited through a forward movement of a seat and a forward pivoting operation of a seatback so that the steering wheel may be easily sterilized due to UV light emitted from a UVC LED of the UV LED module.

Second, a forward reclining angle of the seatback is adjusted according to a tilting angle of the steering wheel to allow the UV LED module mounted on the headrest to be disposed collinear with a central portion of the steering wheel so that it is possible to maximize a sterilization effect due to the UV light emitted from the UVC LED of the UV LED module.

Eventually, it is possible to prevent bacteria transmission or virus infection due to a touch of the steering wheel.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

While the embodiments of the present disclosure have been described with reference to the accompanying drawings, a person skilled in the art to which the present disclosure pertains may understand that the present disclosure can be implemented in other specific form without departing from the technical spirit and essential features of the present disclosure. Therefore, it should be understood that the above-described embodiments are not restrictive but illustrative in all aspects.

What is claimed is:

1. A system for sterilizing an interior of a vehicle, comprising:
    a sterilizer disposed on a driver's seat of the vehicle and configured to sterilize the interior of the vehicle;
    a driver detection sensor configured to detect a presence of a driver inside the vehicle;
    a seat movement adjustment mechanism configured to move the driver's seat; and
    a controller configured to, in response to receiving a non-detection signal from the driver detection sensor, send driving signals to the seat movement adjustment mechanism, adjust a distance and an angle between the sterilizer and a surrounding object of the sterilizer and then apply a sterilizer operation signal for operating the sterilizer for a certain period of time upon movement of the driver's seat, wherein the seat movement adjustment mechanism includes:
    an electric sliding device configured to adjust forward and backward movements of the driver's seat;
    an electric reclining device configured to adjust forward and backward angles of a seatback of the driver's seat; and
    a seat memory device configured to be programmed to remember a position of the driver's seat,
    wherein the controller is configured to be programmed to control the electric sliding device, the electric reclining device, and the seat memory device, and a function of each of the electric sliding device, the electric reclining device, and the seat memory device.

2. The system of claim 1, wherein the sterilizer is an ultraviolet light-emitting diode (UV LED) module located on a front portion of a headrest of the driver's seat, the UV LED module configured to be controlled, by the controller, to emit UV light toward a steering wheel to sterilize the steering wheel and surroundings of the steering wheel.

3. The system of claim 2, wherein the UV LED module includes:
    a bezel disposed on the front portion of the headrest;
    an LED control substrate disposed on a rear portion of the bezel; and
    an ultraviolet C (UVC) LED attached to the LED control substrate.

4. The system of claim 3, wherein the UVC LED comprises a lens disposed at a front portion of the UVC LED, the lens configured to be controlled to adjust an irradiation angle of the UV light according to an outer diameter of the steering wheel.

5. The system of claim 1, wherein the driver detection sensor includes at least one of a body pressure sensor disposed inside the driver's seat or a Rear Occupant Alert (ROA) sensor disposed inside the vehicle.

6. The system of claim 1, further comprising:
    a door lock switch configured to lock or unlock a door of the vehicle; and
    a door opening and closing switch configured to output an opening signal and closing signal, respectively, of the door,
    wherein the door lock switch and the door opening and closing switch are configured to communicate with the controller for determining whether the driver is presented inside the vehicle before the controller operates the sterilizer.

7. The system of claim 1, wherein the driving signals of the controller include a first driving signal and a second driving signal, and
    wherein, when the controller receives, while the vehicle is off, a door locking signal of the door lock switch and a door closing signal of the door opening/closing switch and receives a sterilization request signal from an external terminal held by the driver, the controller is configured to determine a non-detection condition of the driver, apply the first driving signal for a forward movement of the driver's seat to the electric sliding device and the second driving signal for a forward pivoting movement of the seatback to the electric reclining device, and then apply the sterilizer operating signal for UV light irradiation to the UV LED module for the certain period of time.

8. The system of claim 1, further comprising a steering column angle sensor configured to detect a vertical tilt angle of the steering wheel and transmit the detected vertical tilt angle to the controller.

9. The system of claim 8, wherein the controller is configured to apply a second driving signal to the electric reclining device such that a forward pivoting angle of the seatback is controlled to be adjusted to an angle, at which the UV LED module is disposed collinear with a central portion of the steering wheel, according to the vertical tilt angle of the steering wheel.

\* \* \* \* \*